Patented Oct. 27, 1953

2,657,204

UNITED STATES PATENT OFFICE 2,657,204

AZO PIGMENT

John De Lucia, Bronx, N. Y., and Robert Eltonhead, Fort Lee, N. J., assignors to Interchemical Corporation, New York, N. Y., a corporation of Ohio No Drawing. Application July 30, 1951,
Serial No. 239,389

1 Claim. (Cl. 260—176)

This invention relates to a new insoluble dyestuff or pigment which is obtained by coupling tetrazotized 3,3'-dichlorobenzidine with acetoacet-2,4-dimethoxyanilide. The new product is especially useful as a pigment dispersed in organic solvent solutions of synthetic resins such as are employed for resin-bonded pigment printing of cotton, rayon and other fabrics.

A series of pigment colors has been developed for the afore-stated purpose which is characterized by superlative fastness to light, even in pastel shades, brilliancy of color and an exceptionally high degree of fastness to washing, chlorine and dry cleaning; with the one exception of the green-shade yellows of the series which are taken either from the group of the so-called Hansa yellow dyes comprising monoazo couplings with aceto-acetic arylides or from the so-called Benzidine yellows which are prepared by tetrazotizing 3,3'-dichlorobenzidine and coupling with aceto-acet anilide, aceto-acet-o-toluidide, aceto-aceto-o-anisidide, or aceto-acetom-xylidide. These yellows prove to be greatly inferior to the other pigments of the series, the Benzidine yellows especially with respect to light fastness; while the Hansa yellows, although lightfast, are solvent soluble and fail completely in dry cleaning requirements. Prior attempts of replacing these yellow pigments by others of better quality have been unsuccessful because it was either impossible to approximate their color shade, or if the color was about the same, the substitute was qualitatively inferior.

Generally speaking, the dyestuffs which have been prepared with the object of producing a better green-shade yellow represent attempts of finding a lightfast substitute for the Benzidine yellows. They differ from each other in the radical or radicals replacing one or more hydrogens in the aryl nucleus of the aceto-acet compound. These substituents, which change, but do not originate, the color of the dyestuff, are called "auxochromes." Although several theories have been advanced as to the correlation between the light fastness of this type of pigments and the nuclear substituents of the aceto-acet amide, from a practical standpoint the specific action of such substituents is entirely unpredictable. As a general rule, however, where the substituents impart light fastness, the color shades change from yellow to orange, or even to red, which, obviously, eliminates such pigments as replacements for the green-shade Hansa or Benzidine yellows to which the trade has become accustomed.

A typical illustration of the foregoing statement is furnished by the pigment obtained by coupling tetrazotized 3,3'-dichlorobenzidine with aceto-acet-2,5-dimethoxy-aniline. Although this pigment is greatly superior in light fastness, wash fastness and tinting strength to, say, tetrazotized 3,3'-dichlorobenzidine coupled with aceto-aceto-toluidine, it is unacceptable as a substitute for the latter because of its color shade, which, due to the presence of a strong red component, is an orange. Therefore, it was entirely unexpected that the coupling product of tetrazotized 3,3'-dichlorobenzidine with the isomeric aceto-acet-2,4-dimethoxy-aniline would not only show the desired light and wash-fastness, but produce a color shade substantially like that of the coupling product between tetrazotized 3,3'-dichlorobenzidine and aceto-acet-o-toluidine.

The pigment of this invention is made in the usual manner from 3,3'-dichlorobenzidine and aceto-acet-2,4-dimethoxyanilide. It has the chemical structure:

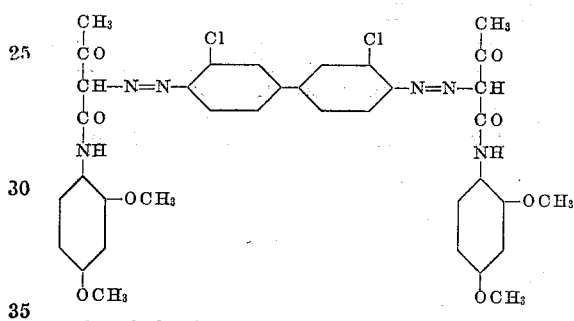

The following example in which the parts given are parts by weight illustrates one method of preparation:

253 parts 3,3'-dichlorobenzidine in form of a paste are stirred into a hydrochloric acid solution prepared by pouring 405 parts 10 N HCl into 3,250 parts water. The slurry is stirred several hours and immersed in an ice-water bath, 1500 parts ice are introduced into the slurry and when the slurry has cooled to 0° C., there is added all at once 160 parts sodium nitrite dissolved in 800 parts water. After stirring for one hour at a temperature of 0°–5° C., the tetrazo solution obtained in this manner is clarified with activated carbon and filtered.

In the meantime, 478 parts aceto-acet-2,4-dimethoxy-aniline are dissolved in a caustic soda solution prepared from 292 parts 10 N NaOH diluted with 500 parts water. After stirring to complete solution, there is added 4,000 parts water and 1000 parts ice. The coupling component is precipitated from the iced solution in form of fine crystals by slowly adding 255 parts 10 N HCl diluted with 1250 parts water. After addition of 555 parts anhydrous sodium acetate and vigorous stirring, the slurry is checked with litmus to make sure it is slightly acid.

While maintaining a temperature of 0°–5° C., the tetrazo solution is slowly added to the coupling slurry, the addition taking about one hour. After stirring for two more hours to insure a complete reaction, the pigment which is formed is filtered off, washed until free from acid and then retained either as a pigment pulp or dried, depending upon its end-use.

Below are given the results of a spectrophotometric comparison between (A), the coupling product of tetrazotized 3,3'-dichlorobenzidine and aceto-acet-o-toluidine and (B), the coupling product of tetrazotized 3,3'-dichlorobenzidine and aceto-acet-2,4-dimethoxy-aniline. For this purpose, stock pastes are made up in the manner of preparing stock for printing resin-bonded pigments on textiles. The stock is cut to the necessary consistency and desired pigment strength; in this instance to a pigment strength which, by visual comparison, produces finished printing media about equal in tinctorial value. Prints made on white cotton goods are then measured spectrophotometrically and the dominant wavelength, brightness, and purity of the samples is determined from the spectrophotometric reflectance curves according to the system of the International Commission on Illumination (Handbook of Colorimetry, 1936, The Technology Press, Massachusetts Institute of Technology, Cambridge, Mass.)

| Pigment | Dominant Wavelength, mμ | Brightness, Percent | Purity, Percent |
|---------|------------------------|---------------------|-----------------|
| A | 573.3 | 72.6 | 72.3 |
| B | 574.6 | 69.9 | 70.0 |

Of these factors, the dominant wavelength is the most important since it remains constant irrespective of the pigment concentration and specifies the spectrum color which the sample most closely resembles. The degree of brightness indicates the lightness or darkness of a sample, while the purity corresponds to the amount of gray present in the sample. From the table can be seen that, with respect to dominant wavelength, the two samples are practically identical. Sample A, however, shows somewhat greater brightness and higher purity than sample B. Since the pigment strength had been adjusted by visual matching at a ratio of 1 part of pigment in sample A to 0.65 part in sample B, it is obvious that a slight increase in the pigment strength of sample B will raise the brightness and purity of this sample to that of sample A. Nevertheless, it is apparent that the tinting strength of the herein claimed 2,4-dimethoxy anilide derivative is at least one-third higher than the tinting strength of the o-toluidine derivative. The new compound is sufficiently solvent-fast and non-bleeding in oils to render it particularly suited as a member of the initially described series of pigments.

We claim:
The compound having the formula:

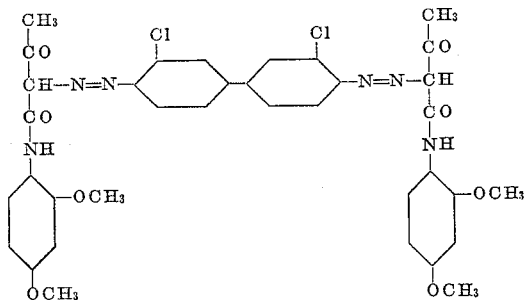

JOHN DE LUCIA.
ROBERT ELTONHEAD.

References Cited in the file of this patent
UNITED STATES PATENTS

| Number | Name | Date |
|--------|------|------|
| 2,043,869 | Schmid | June 9, 1936 |
| 2,100,378 | Carr | Nov. 30, 1937 |
| 2,361,566 | Reynolds | Oct. 31, 1944 |
| 2,361,567 | Reynolds | Oct. 31, 1944 |
| 2,492,907 | Glahn | Dec. 27, 1949 |